(12) United States Patent
Lu et al.

(10) Patent No.: US 10,894,231 B2
(45) Date of Patent: Jan. 19, 2021

(54) WASTE GAS TREATMENT METHOD WITH APPLICATION OF NANO-BUBBLE AND WASTE GAS TREATMENT SYSTEM USING THE SAME

(71) Applicant: KUNSHAN NANO NEW MATERIAL TECHNOLOGY CO., LTD, Jiangsu Province (CN)

(72) Inventors: Hung-Tu Lu, Taipei (TW); Cheng-Wen Lo, Jiangsu Province (CN); Tak Ngai Samuel Si, Hong Kong (CN)

(73) Assignee: Kunshan Nano New Material Technology Co., Ltd., Kunshan (CN)

( * ) Notice: Subject to any disclaimer, the term of this patent is extended or adjusted under 35 U.S.C. 154(b) by 536 days.

(21) Appl. No.: 15/912,568

(22) Filed: Mar. 6, 2018

(65) Prior Publication Data
US 2018/0272276 A1    Sep. 27, 2018

(30) Foreign Application Priority Data

Mar. 21, 2017 (TW) .............................. 106109420 A

(51) Int. Cl.
| | | |
|---|---|---|
| *B01D 53/78* | (2006.01) | |
| *B01D 53/44* | (2006.01) | |
| *B01D 53/76* | (2006.01) | |
| *B01D 53/75* | (2006.01) | |
| *B04C 5/185* | (2006.01) | |
| *B04C 5/23* | (2006.01) | |
| *B01D 61/18* | (2006.01) | |
| *B01D 61/16* | (2006.01) | |
| *B82Y 30/00* | (2011.01) | |

(52) U.S. Cl.
CPC ............ *B01D 53/78* (2013.01); *B01D 53/44* (2013.01); *B01D 53/75* (2013.01); *B01D 53/76* (2013.01); *B01D 61/16* (2013.01); *B01D 61/18* (2013.01); *B04C 5/185* (2013.01); *B04C 5/23* (2013.01); *B01D 2257/302* (2013.01); *B01D 2257/402* (2013.01); *B01D 2257/404* (2013.01); *B01D 2257/60* (2013.01); *B01D 2257/708* (2013.01); *B01D 2257/91* (2013.01); *B82Y 30/00* (2013.01)

(58) Field of Classification Search
CPC .......... B01D 3/00; B01D 3/009; B01D 53/00; B01D 53/14; B01D 53/34; B01D 53/38; B01D 53/40; B01D 53/78; B01D 53/8681; B01D 2252/103; B01D 2258/0283; B01J 10/00; B01J 19/2405; B01F 3/04; B01F 3/04099; B01F 2003/04858; B01F 5/00
See application file for complete search history.

(56) References Cited

U.S. PATENT DOCUMENTS

| | | | | |
|---|---|---|---|---|
| 8,490,389 | B2 * | 7/2013 | Yano | ........................ F01N 3/36 60/286 |
| 2009/0127188 | A1 * | 5/2009 | Yamasaki | .............. B01D 61/18 210/605 |

FOREIGN PATENT DOCUMENTS

| | | | | | |
|---|---|---|---|---|---|
| CA | 3001797 | A1 | * | 10/2019 | .......... B01D 47/021 |
| CN | 205730831 | U | * | 11/2016 | .............. B01D 53/76 |
| CN | 207221575 | U | * | 4/2018 | .............. B01D 47/06 |
| CN | 208130739 | U | * | 11/2018 | .............. B01D 50/00 |
| CN | 109794155 | A | * | 5/2019 | .............. B01D 53/78 |
| CN | 109806752 | A | * | 5/2019 | .............. B01D 53/78 |
| CN | 208911806 | U | * | 5/2019 | .............. B01D 53/78 |
| CN | 208927837 | U | * | 6/2019 | .............. B01D 47/06 |
| CN | 208959608 | U | * | 6/2019 | .............. B01D 53/74 |
| CN | 209317462 | U | * | 8/2019 | ................ B01F 3/04 |
| CN | 110280117 | A | * | 9/2019 | .............. B01D 53/75 |
| CN | 209348376 | U | * | 9/2019 | .............. B01D 53/18 |
| CN | 110508113 | A | * | 11/2019 | .............. B01D 53/44 |
| CN | 209714743 | U | * | 12/2019 | .............. B01D 53/78 |
| CN | 107243234 | B | * | 2/2020 | .............. B01D 53/74 |
| CN | 110508113 | B | * | 2/2020 | .............. B01D 53/44 |
| JP | 2009165992 | A | * | 7/2009 | .............. B01D 53/44 |

* cited by examiner

*Primary Examiner* — Timothy C Vanoy
(74) *Attorney, Agent, or Firm* — Wang Law Firm, Inc.

(57) ABSTRACT

A waste gas treatment method with the application of nano-bubbles and a waste gas treatment system using the same are provided. The method includes the steps of: feeding waste gas to an accommodating space; flowing a predetermined body of water in the accommodating space and generating the predetermined body of water including nano-bubbles; directing the waste gas mixed with the predetermined body of water including the nano-bubbles to a swirling unit; and discharging the treated gas waste. The predetermined body of water including the nano-bubbles is mixed with the waste gas so that the nano-bubbles of the predetermined water and the waste gas may be sufficiently subjected to the cavitation effect and supercritical water oxidation, and harmful substances such as sulfur dioxide, nitrogen monoxide and other nitrogen oxides, volatile organic compounds, heavy metals and the like, of the waste gas may be removed.

10 Claims, 5 Drawing Sheets

WASTE GAS TREATMENT METHOD WITH APPLICATION OF NANO-BUBBLE AND WASTE GAS TREATMENT SYSTEM USING THE SAME

CROSS-REFERENCE TO RELATED APPLICATION

This application claims priority from Taiwan Patent Application No. 106109420, filed on Mar. 21, 2017 at Taiwan Intellectual Property Office, the contents of which are hereby incorporated by reference in their entirety for all purposes.

BACKGROUND OF THE INVENTION

1. Field of the Invention

The present invention is related to the field of waste gas treatment technology, in particular, to a waste gas treatment method with the application of nano-bubbles and the waste gas treatment system thereof which generates the nano-bubbles within a predetermined body of water in order to treat the waste gas including sulfur dioxide, nitrogen monoxide and other nitrogen oxides, volatile organic compounds (VOC), heavy metals and the like, and to remove the contaminants from within the waste gas.

2. Description of the Related Art

Air, and its component gases, is necessary for human survival. The recent increase of air pollution worldwide causes health concerns for breathable air. Air pollution is generally caused by the accumulation contaminants of manufacturing processes, fuel consumed during public or private transportation which is typically found in vehicles, and the burning of fuel for industrial, commercial, or residential use. Of these accumulation types, waste gas generated by manufacturing processes is a significant portion of air pollution. However, the waste gas generated during the process of manufacturing is difficult to be avoided. If the generated waste gas is further purified by a waste gas treating device so as to remove the contained harmful substances, the influence to the air pollution may be reduced.

In view of this, it is necessary to provide a waste gas treatment method with the application of nano-bubbles and a waste gas treatment system thereof for efficiently solving the waste gas pollution problems.

SUMMARY OF THE INVENTION

In view of the aforementioned problems, the object of the present invention is to provide a waste gas treatment method with the application of nano-bubbles and a waste gas treatment system thereof, in order to solve the problems faced in the prior art.

Based on the objects described above, the present invention provides a waste gas treatment method with the application of nano-bubbles, comprising the steps as follows: Waste gas is fed into an accommodating space; a predetermined body of water is flowed with nano-bubbles being generated in the predetermined body of water, the waste gas and the predetermined body of water including the nano-bubbles are subjected to decomposition and oxidation treatments, wherein the predetermined water is Nano Super Ion Water. The waste gas is mixed with the predetermined body of water including the nano-bubbles in a swirling unit. The waste gas is mixed with the predetermined body of water in the accommodating space, the swirling unit is a cylinder having a swirl stage, and the treated waste gas is exhausted. Wherein, the pH value of the Nano Super Ion Water is between 8 and 14, and a half-width value of the Nano Super Ion Water measured by $^{17}$O-NMR is between 45 Hz and 70 Hz.

Preferably, the method further comprises the steps of: feeding the waste gas from the bottom of the accommodating space; and generating the predetermined body of water including the nano-bubbles at the top of the accommodating space.

Preferably, the method further comprises the steps of: nebulizing the predetermined body of water at the bottom of the accommodating space in order to react with the waste gas and then discharging the predetermined body of water which reacted with the waste gas to an external circulating water system.

Preferably, the method further comprises the steps of: generating anions at the bottom of the accommodating space.

Based on the objects described above, the present invention further provides a waste gas treatment system with the application of nano-bubbles, comprising an air inlet, a nano-bubble generating device and an airflow swirling device. The air inlet is configured to provide waste gas to an accommodating space. A nano-bubble generating device is disposed in the accommodating space. An nano-bubble generating device is configured to provide a predetermined body of water and generate the nano-bubbles within the predetermined body of water. The predetermined body of water, including the nano-bubbles and the waste gas, is then subjected to decomposition and oxidation treatments. The airflow swirling device comprises a drive unit and a swirling unit. The swirling unit is connected to the accommodating space. The drive unit is between the swirling unit and the accommodating space so as to receive the waste gas mixed with the predetermined body of water including the nano-bubbles. Wherein, the predetermined body of water is Nano Super Ion Water. The pH value of the Nano Super Ion Water is between 8 and 14, and a half-width value of the Nano Super Ion Water measured by $^{17}$O-NMR is between 45 Hz and 70 Hz. Wherein, the predetermined body of water including the nano-bubbles and the waste gas is subjected to the cavitation effect and supercritical water oxidation, so as to remove harmful substances within the waste gas.

Preferably, the nano-bubble generating device comprises a nano-bubble generator; the nano-bubble generating device is disposed nearby the top of the accommodating space, so as to generate the nano-bubbles within the predetermined body of water.

Preferably, the nano-bubble generating device is connected to a circulating water system, so as to obtain the predetermined body of water.

Preferably, the nano-bubble generating device further comprises a nebulizer which is disposed nearby the bottom of the accommodating space, so that the predetermined body of water is sprayed as water mist.

Preferably, the nebulizer is connected to a circulating water system.

Preferably, the waste gas treatment system with the application of nano-bubbles further comprises an anion generator which is disposed nearby the bottom of the accommodating space, so as to generate anions.

According to the above descriptions, the waste gas treatment method with the application of nano-bubbles and the waste gas treatment system thereof of the present invention generates nano-bubbles and directs the nano-bubbles into the waste gas treatment system by the predetermined body of water comprised of one of either; Nano Super Ion Water, alkaline water or electrolyzed water. After the nano-bubbles of the predetermined body of water is sufficiently mixed with the waste gas, the dust, heavy metal and organic contaminants such as sulfur dioxide, nitrogen monoxide and other nitrogen oxides, volatile organic compounds (VOC) within the waste gas are encapsulated and cleaned by the process, and are efficiently dissolved in the body of water so as to facilitate the decomposition and oxidation treatments carried out by the nano-bubbles of the predetermined water, under the physical and chemical collaborative process induced by the cleaning and penetration abilities of the tiny water molecules of the predetermined body of water and the cavitation effect of the nano-bubbles. The waste gas treatment method with the application of the nano-bubbles and the waste gas treatment system thereof of the present invention continuously purifies the air by oxidation and decomposition not only within the body of water but also during the process of dispersion by the nano-bubbles of the predetermined body of water, so as to achieve the effect of removing the harmful substances within the air and to meet the local disposal standards of the waste gas exhausting.

DESCRIPTION OF THE PREFERRED EMBODIMENTS

For ease of understanding the features, contents and advantages of the present invention and the effects which may be achieved by the same, the present invention will be described in details by the form of embodiments taken in conjunction of the appending drawings. The appending drawings used therein are merely intended to illustrate and support the specification, and are not intended to be the actual ratios and the accurate configurations after the implementation of the present invention. Hence, the scope of the implementation of the present invention should not be interpreted according to and limited to the ratio of the appending drawings and the configuration relationship.

The advantages, features of the present invention and the technical solutions achieving thereto will be described in details referred to the exemplary embodiments and the appending drawings for ease of being understood. Further, the present invention may be achieved in various forms, and thus should not be understood as intended to being limited to the embodiments described herein. In contrast, the scope of the present invention will be further clearly, entirely and fully conveyed to a person skilled in the art, by the embodiments provided herein. Furthermore, the scope of the present invention is only defined by the appended claims.

In the description of the present invention, it has to be explained that the terms "install", "connect", "link", "dispose" should be broadly understood unless otherwise indicated to limited, for example, may be fixed connected, may be detachably connected, or integrated connected; may be mechanically connected, may be electrically connected; may be directly connected, may be connected with an intermediated, or may be a connection inside two elements. A person skilled in the art is able to understand the particular meaning of the above terms in the present invention based on the particular circumstances.

Figure 1:
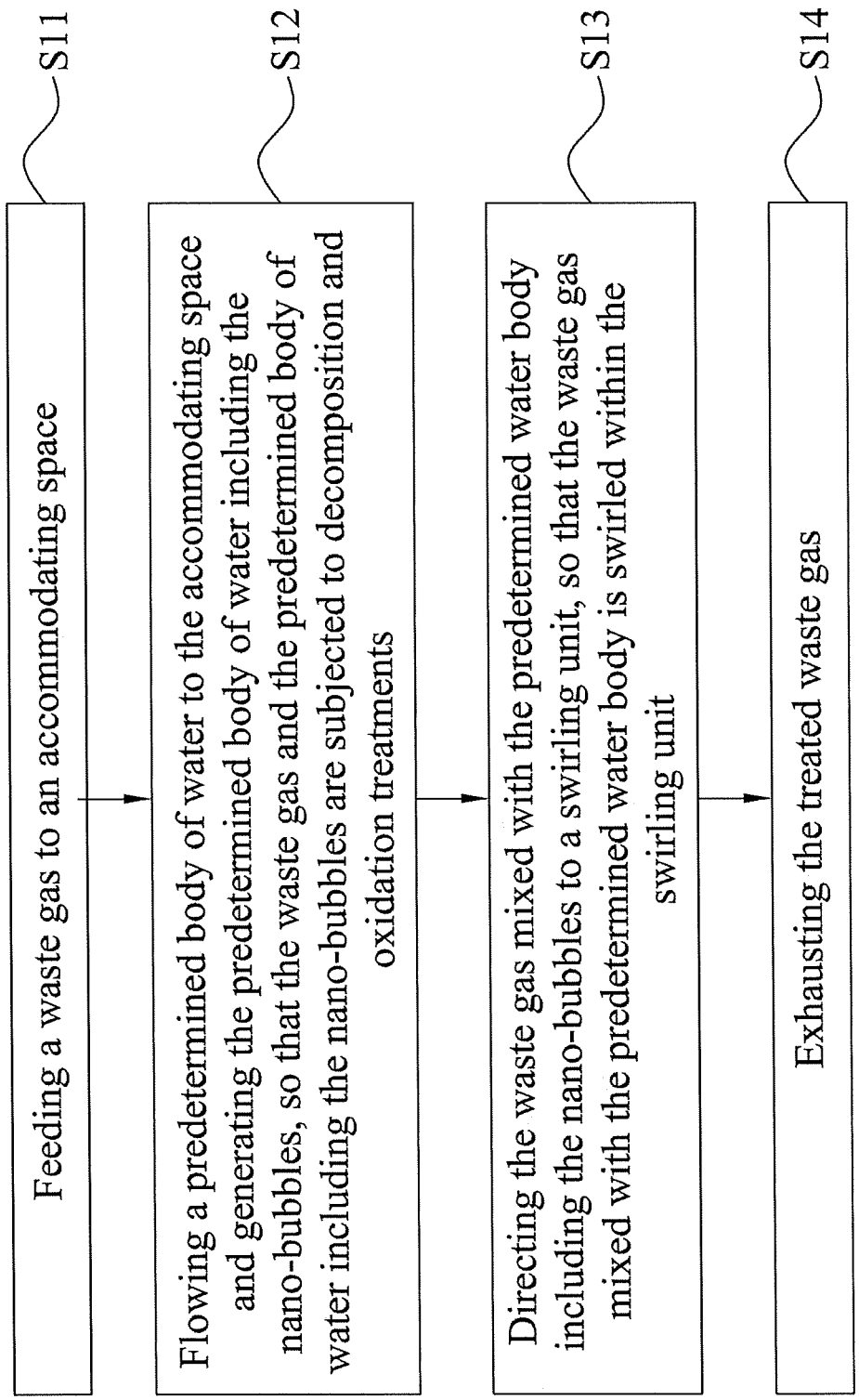
FIG. 1 is a flowing chart of a waste gas treatment method with the application of the nano-bubbles.

Please refer to FIG. 1, which is a flow chart of the waste gas treatment method with the application of nano-bubbles of the present invention. As shown in the drawings, the waste gas treatment method with the application of nano-bubbles of the present invention comprises the steps as follows: (S11) feeding a waste gas to an accommodating space; (S12) flowing a predetermined body of water to the accommodating space and generating the predetermined body of water including the nano-bubbles, so that the waste gas and the predetermined body of water including the nano-bubbles are subjected to decomposition and oxidation treatments, wherein the predetermined water is selected from one of either Nano Super Ion Water, alkaline water, or electrolyzed water; (S13) directing the waste gas mixed with the predetermined body of water including the nano-bubbles to a swirling unit, so that the waste gas mixed with the predetermined body of water is swirled within the swirling unit; and (S14) exhausting the treated waste gas.

Regarding the waste gas treatment method with the application of nano-bubbles, it will be described in details in the following waste gas treatment system with the application of nano-bubbles.

Figure 2:
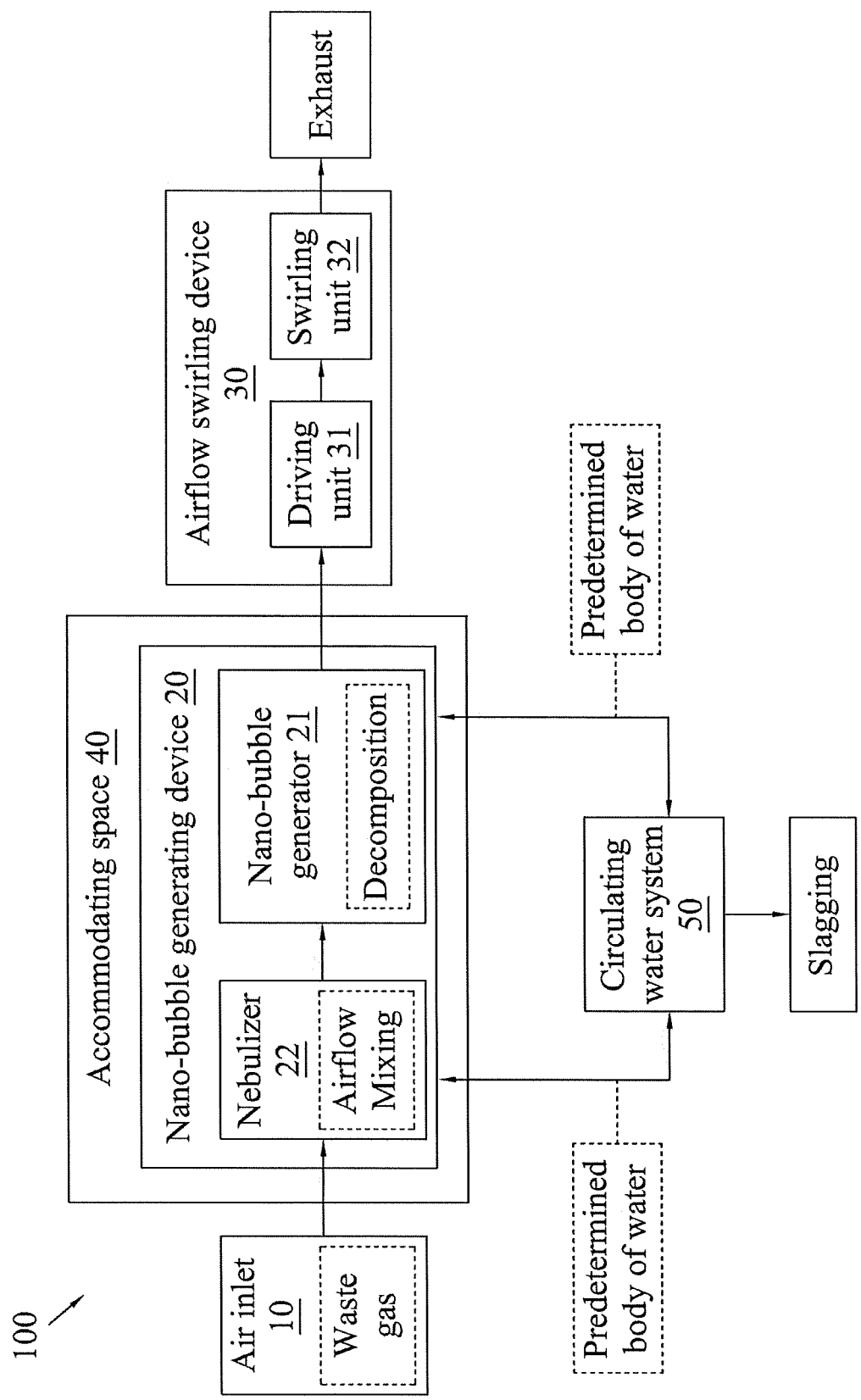
FIG. 2 is a block diagram of the first embodiment of the waste gas treatment system with the application of the nano-bubbles of the present invention.
Figure 3:
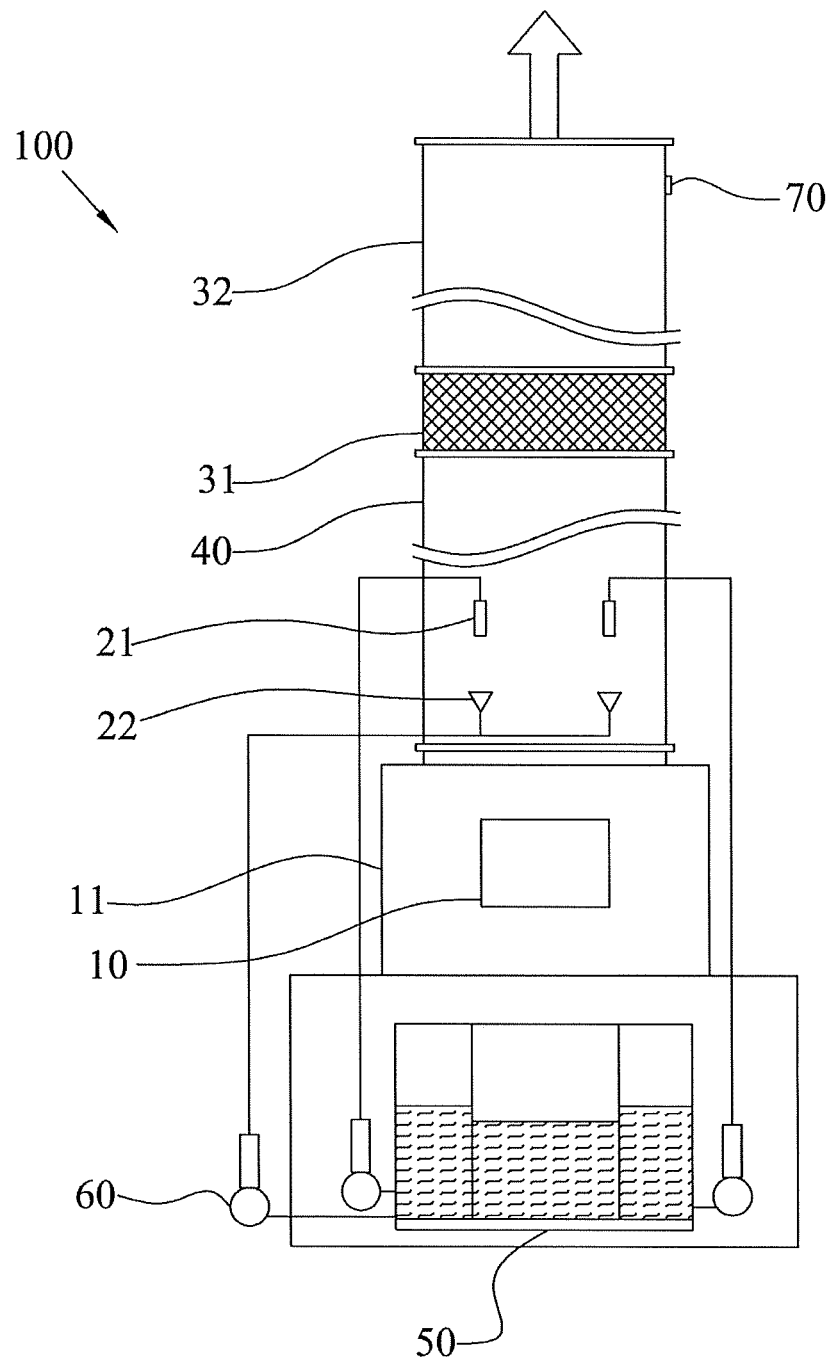
FIG. 3 is a systemic diagram of the first embodiment of the water gas treatment system with the application of the nano-bubbles of the present invention.

Please refer to FIGS. 2 and 3, which is a block diagram of the first embodiment of the waste gas treatment system with the application of nano-bubbles of the present invention. As shown in the drawings, the waste gas treatment system with the application of nano-bubbles 100 comprises an air inlet 10, a nano-bubble generating device 20 and an airflow swirling unit 30.

Wherein, the air inlet 10 connects to a device which generates the waste gas or a piping which transports the waste gas, and the air inlet 10 is configured to provide the waste gas to an accommodating space 40. The accommodating space 40 may be a cylinder, or other such shape. The air inlet 10 may be connected to a waste gas fume hood 11, then into the accommodating space 40 through the bottom of the accommodating space 40. The nano-bubble generating device 20 is disposed in the accommodating space 40. The nano-bubble generating device 20 is configured to provide the predetermined body of water such as one selected from either Nano Super Ion Water, alkaline water or electrolyzed water, and further generates the nano-bubbles within the predetermined body of water. The predetermined body of water including the nano-bubbles and the waste gas may then be mixed in the accommodating space 40.

Wherein, the Nano Super Ion Water will be described as an exemplary aspect in the present embodiment, but is not limited thereto. Alkaline water and electrolyzed water are also appropriate for this process.

Further, the Nano Super Ion Water is a water product used for cleaning generated by an electrolysis method. Preferably, the pH value of the Nano Super Ion Water is between 8 and 14, and the half-width value of the Nano Super Ion Water measured by $^{17}$O-NMR is between 45 Hz and 70 Hz. After the molecules of the Nano Super Ion Water are treated by the electrolysis method, the molecule clusters therein may reassemble to become further tiny clusters. Wherein, the Nano Super Ion Water does not comprise heavy metals, surfactants and harmful chemical substances, therefor, the product is harmless to the human body and the environment and provides superior cleaning effect. In addition, the molecules of the Nano Super Ion Water have a negative charge and are sufficiently tiny water molecules, which may efficiently and quickly capture, encircle and/or penetrate the interface or surface of the waste gas and detritus such as the sulfur dioxide, nitrogen monoxide and other nitrogen oxides, volatile organic compounds (VOC) or heavy metal on a surface or in the air, in comparison with normal liquid water (the alkaline water and the electrolyzed water also have the same properties). Furthermore, the Nano Super Ion Water may emulsify and/or decompose the detritus. The high density of hydroxyl ions contained therein may destroy bacteria (e.g. *Legionella, E. coli*) instantly.

Wherein, the nano-bubble generating device 20 comprises a nano-bubble generator 21. The nano-bubble generator 21 is disposed nearby the top of the accommodating space 40, so as to generate the nano-bubbles within the predetermined body of water such as the Nano Super Ion Water. In addition, preferably, the nano-bubble generator 20 may further comprise a nebulizer 22. The nebulizer 22 is disposed nearby the bottom of the accommodating space 40, so that the predetermined body of water is sprayed as water mist.

Therefore, on the one hand, the waste gas fed from the bottom of the accommodating space 40 may be raised within the accommodating space 40, and the predetermined body of water including the nano-bubbles generated by the nano-bubble generating device 20 will be mixed with the waste gas. Simultaneously, the predetermined body of water such as the Nano Super Ion water may efficiently and quickly capture, encircle and penetrate the interface or surface of the waste gas and detritus such as the sulfur dioxide, nitrogen monoxide and other nitrogen oxides, volatile organic compounds (VOC) or heavy metal within the waste gas. When the nano-bubbles collapse, 5000K of high temperature and 1800 atm of atmospheric pressure will be generated instantly, thereby, to release a large amount of hydroxyls and free radicals and to carry out the physical and chemical reactions, such as mechanical shearing, thermal decomposition and bond breaking, free radical oxidation and supercritical water oxidation, with the captured organic gas in order to achieve the decomposition and removing of the contaminants within the waste gas.

On the other hand, since the nebulizer 22 sprays the predetermined body of water as water mist at the bottom of the accommodating space 40, the predetermined body of water and the organic waste gas and other gas such as VOC within the waste gas are being captured and contacted, simultaneously. The contaminants within the waste gas may be dissolved in the predetermined body of water and may be directed into, such as, a circulating water system 50. According to the aforementioned method, the contaminants within the waste gas may be efficiently decomposed and removed.

Continuously, the bubbles generated by the nano-bubble generator 21 have a diameter of 10 μm to hundreds of nm and strong gasification property. This kind of bubble has the physical and chemical properties that are not contained in normal bubbles. Further, the properties of the predetermined body of water including the nano-bubbles are large self-specific surface area, low rising speed, self-pressurized dissolution, negative surface charge, and the generation of a large amount of free radicals. Hence, an energy transient release of enormous energy power and the characteristics of strong oxidability are shown, and may transform a part of the contaminants to carbon dioxide and water with another part being mineralized and/or formed as particle shape which may become sunk into the water and has characteristics of being non-burning, insoluble and non-toxic.

Hence, the waste gas treatment system with the application of nano-bubbles 100 may continuously decompose and gas oxidize the organic gas, by utilizing cavitation effect of the nano-bubbles within the predetermined body of water under a principles of capturing and encircling the organic waste gases and carrying out the physical and chemical reactions such as mechanical shearing, thermal decomposition and bond breaking, free radical oxidation and supercritical water oxidation.

On the other hand, the airflow swirling device 30 comprises a drive unit 31 and a swirling unit 32. Wherein, the swirling unit 32 may be a cylinder having a swirl stage which is connected on the accommodating space 40 for receiving the waste gas mixed with the predetermined body of water including the nano-bubbles. The drive unit 31 may be a screw-type ventilator for directing the waste gas mixed with the predetermined body of water including the nano-bubbles into the swirling unit 32. Wherein, the predetermined body of water including the nano-bubbles and the waste gas carry out the cavitation effect and supercritical water oxidation and remove the contaminants of the waste gas.

Furthermore, the organic gas is guided into the waste gas fume hood 11 through the piping from the air inlet 10, so as to enter the accommodating space 40. Then, the nebulizer 22 forms a large amount of water mist by a nebulized nozzle by means of oxygen-enhancement (comprised or connected to a oxygen-enhancement device) and by the role of a high pressure water pump, thereby, capturing and contacting the organic waste gas and the other gases such as VOC (volatile organic compounds) which enter from the air inlet 10. Wherein the oxidation ability of the nebulizer 22 supplements the oxygen atoms required for treating the organic gas; and the organic gas and the other gases such as VOC are mixed with the predetermined body of water including the nano-bubbles.

In the above descriptions, the nano-bubble generating device 20 generates the tiny bubbles with a nanoscale by the nano-bubble generator 21 through a multi-stage high-pressure pump having a lift head which may achieve 120 meters as the driving force. Because of the cavitation effect, the nano-bubbles of the Nano Super Ion Water are collapsed within a time period of $10^{-9}$ second, and generates 5000K of temperature and 1800 atm of atmospheric pressure instantly, thereby, releasing a large amount of hydroxyls and free radicals and caning out physical and chemical reactions such as mechanical shearing, thermal decomposition and bond breaking, free radical oxidation and supercritical water oxidation with the captured organic gas, so as to decompose and remove the contaminant within the waste gas.

The driving unit 31 and the swirling unit 32 are then moved so that the waste gas in the accommodating space 40 is moved to the swirling unit 32, and the gas phase and the liquid phase thereof are sufficiently mixed to form a cyclone. Thus, the contact of the organic waste gas and the predetermined body of water including the nano-bubbles is increased; the reaction time is increased; and the organic waste gas treatment efficiency is improved.

Finally, the organic waste gas is oxidized to water, carbon dioxide, nitrogen and other harmless small molecules such as heavy metal oxide, along with the continuous cavitation effect and supercritical water oxidation of the predetermined body of water including the nano-bubbles. Whereas, the treated waste gas is transferred to normal air and will be exhausted from the top of the swirling unit 32.

Without doubts, the nano-bubble generator 21 and the nebulizer 22 are both connected to the circulating water system 50, so that the predetermined body of water may be obtained by the high pressure or low pressure pump 60. In addition, the circulating water system 50 may also discharge the part which is mineralized, is formed as particle shape and is sunk into the water of the contaminants. Further, a detecting port 70 may be configured at the outlet over the swirling unit 32 for detecting the waste gas treatment efficiency.

Figure 4:
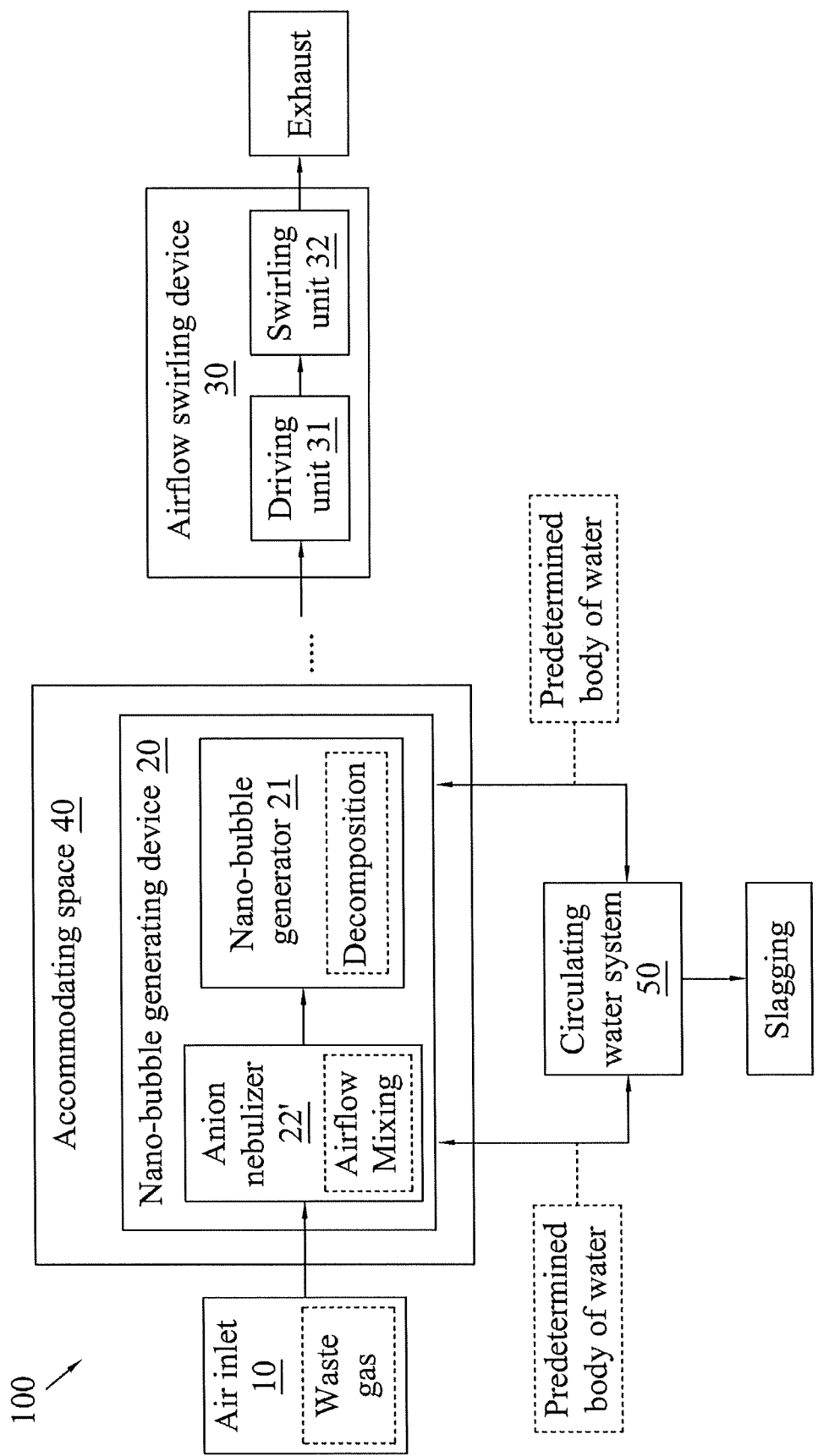
FIG. 4 is a block diagram of the second embodiment of the waste gas treatment system with the application of the nano-bubbles of the present invention.
Figure 5:
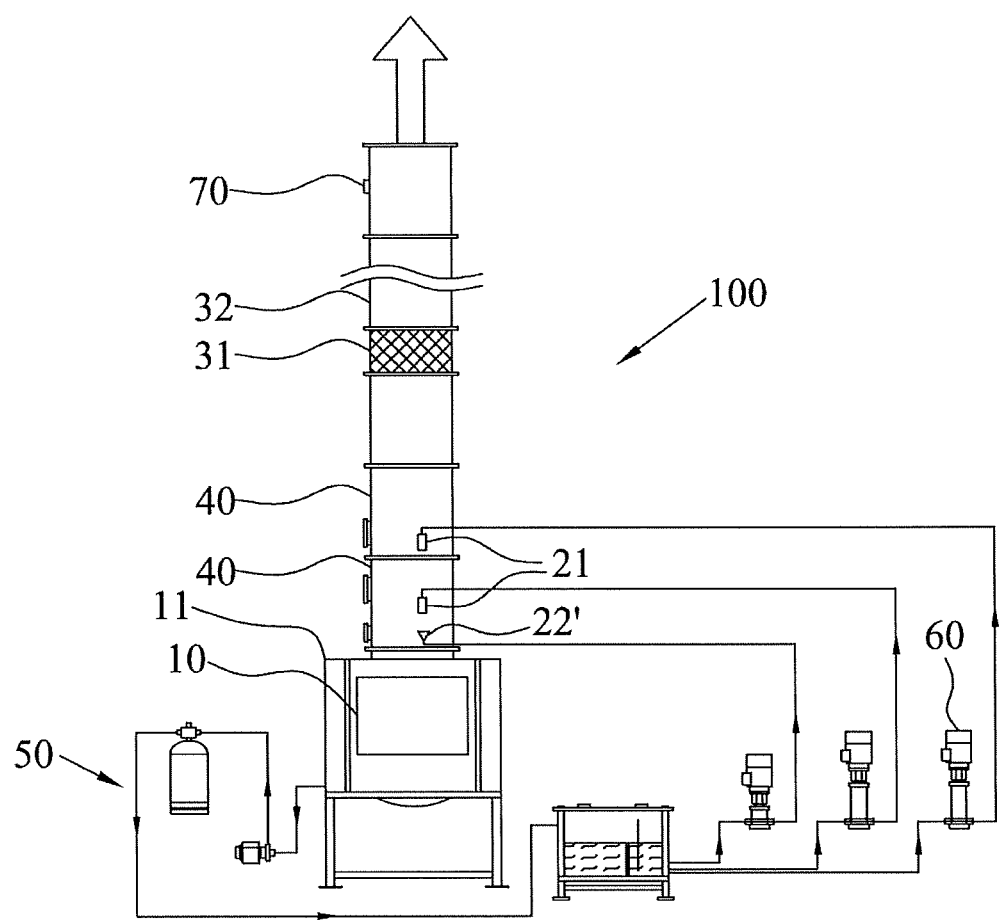
FIG. 5 is a systemic diagram of the second embodiment of the water gas treatment system with the application of the nano-bubbles of the present invention.

Please refer to FIGS. 4 and 5, which are the block diagram and the systemic diagram of the second embodiment of the water gas treatment system applied with the nano-bubbles of the present invention. As shown in the drawings, the waste gas treatment system with the application of nano-bubbles 100 identically comprises an air inlet 10, a nano-bubble generating device 20 and an airflow swirling device 30, which is almost the same as the aforementioned embodiment. The same elements will be indicated with the same numeric labels, and the similar features will not be repeated herein.

The main difference between the present embodiment and the previous embodiment is that the waste gas treatment system with the application of nano-bubbles 100 applying to the Nano Super Ion Water may further comprise an anion generator which may preferably integrated with the nebulizer 22 of the previous embodiment and become an anion nebulizer 22'. The predetermined body of water such as the Nano Super Ion Water that becomes water mist sprayed by the anion nebulizer 22' may have a property of an oxygen anion, based on the configuration of the anion nebulizer 22' and by the role of the low pressure pump 60. Hence, organic gases and the other gases such as VOC entered from the air inlet 10 may be captured and contacted more efficiently.

In addition, the accommodating space 40 and the nano-bubble generator 21 may be configured as a plurality of groups under the substantial demands in order to treat the waste gas more completely and fully.

A cyclone dust collection system may be comprised prior to the period that the waste gas is fed to the accommodating space 40. The cyclone dust collector is a device which utilizes the centrifugal force generated by the rotational motion of the airflow containing dust to separate and capture the dust particles from the gas. The cyclone dust collector has the characteristics of: simple structure, no moving elements, low cost, high efficiency of dust removal, easy maintenance and management, and wide range of applications, in comparison with other dust collectors. It is mainly used for capturing the non-sticky and non-fibrous dry dust particles which have the sizes larger than 5~10 μm. In addition, a water washing and cooling system may also be comprised prior to the period that the waste gas is fed to the accommodating space 40. The water washing and cooling system is a rough separation apparatus which is consists of a tower body, a tower tray and a condenser. The water washing and cooling system is used for separating the mixed gas containing the dust at first. Each of the separated components may not be reacted, and the products may be easily to be liquefied. The impurities such as the dust may be difficult to liquefy or solidify. When the mixed gas has been passed into a washing tower from the middle part thereof, the impurities will be dissolved and stored in the water efficiently in cooperation with the circulation washing with the predetermined body of water, which results in a pre-washing and a cooling effect.

That is, for example, the waste gas of the boiler of the factory area will be transported into a desulfurization tower of the factory area, then transported to the cyclone dust collection system, then transported to the water washing and cooling system, and is then finally transported to the waste gas treatment system with the application of nano-bubbles for treating and discharging.

The present invention disposes a plurality of sampling ports, wherein a sampling port 1 samples before the transportation to the desulfurization tower; a sampling port 2 samples between the desulfurization tower and the cyclone dust removal system; a sampling port 3 samples between the cyclone dust removal system and the water washing and cooling system; a sampling port 4 samples between the water washing and cooling system and the waste gas treatment system with the application of nano-bubbles; a sampling port 5 samples after the discharging of the waste gas treatment system applied with the application of nano-bubbles. The sampled data are shown as follows:

| Analyzed Object | Sampling Port 1 | Sampling Port 2 | Sampling Port 3 | Sampling Port 4 | Sampling Port | Removal Efficiency % | Standard Limitation |
|---|---|---|---|---|---|---|---|
| Nitrogen Oxide ($mg/m^3$) | 263 | 258 | 249 | 220 | 25 | 90.50 | 400 |
| Sulfur Dioxide ($mg/m^3$) | 78 | 77 | 77 | 61 | 9 | 88.46 | 100 |
| Particle substances ($mg/m^3$) | 1390 | 1160 | 447.4 | 195.2 | 23.4 | 98.32 | 30 |
| Mercury and compounds thereof ($mg/m^3$) | 0.070 | 0.045 | 0.018 | 0.013 | 0.005 | 92.86 | 0.05 |
| Smoke blackness (level) | <1 | <1 | | | <1 | | <1 |

Wherein, the reference standards and the analysis methods of the nitrogen oxides are referred to HJ 693-2014<Stationary Source Emission-Determination of Nitrogen Oxides-Fixed Potential by Electrolysis Method>; the reference standards and the analysis methods of the sulfur dioxide is referred to HJ/T 57-2000 <Determination of Sulphur Dioxide from Exhausted Gas of Stationary Source Fixed-potential Electrolysis Method>; the reference standards and the analysis methods of the particle substances (i.e. dust) is referred to GB 5468-1991 <Measurement Method of Smoke and Dust Emission from Boilers>; the reference standards and the analysis methods thereof of mercury and the compounds thereof is referred to Atomic Fluorescence Spectrometry <Air and Exhaust Gas Monitoring and Analysis Methods>, 2003, ($4^{th}$ version), 5.3.7.2; and the reference standards and the analysis methods of the smoke blackness is referred to HJ/T 398-2007 <Stationary source emission-determination of Blackness of Smoke Plumes-Ringelmann Smoke Chart>.

As shown in above table, the present invention has been proven by experiments that the removal efficiency of the nitrogen oxide part may achieve 85~95%; the removal efficiency of the sulfur dioxide part may achieve 83~93%; the removal efficiency of the $PM_{2.5}$ of the suspended particles may achieve 64~74%; and the removal efficiency of the mercury and the compounds thereof part may achieve 88~95%.

In summary, the waste gas treatment method and the waste gas treatment system thereof with the application of nano-bubbles of the present invention is in cooperation with a specific selected predetermined body of water in order to apply in the treatment method of decomposing VOC gas by nano-bubbles, which integrates the characteristic of the predetermined body of water and the advantages of the nano-bubbles and generates the predetermined body of water including the nano-bubbles from the predetermined body of water. Further, be combining and applying these within the waste gas treatment system, the sulfur dioxide, nitrogen monoxide and other nitrogen oxides, dust, suspended particles $PM_{2.5}$, harmful substances, heavy metals, bacteria and VOC (volatile organic compounds) within the waste gas may be removed more efficiently.

Aforementioned embodiments are merely the explanation of the technical concepts and features of the present invention, are intended to be understood and implemented accordingly by a person skilled in the related art, and are not intended to limit the scope of the present invention. That is, any equivalent variations and modifications following spirit of the present invention are covered in the scope of the claims of the present invention.

What is claimed is:

1. A waste gas treatment method with an application of nano-bubbles, comprising steps of:
    feeding waste gas to an accommodating space;
    flowing a predetermined body of water to the accommodating space and generating the predetermined body of water to include the nano-bubbles, so that the waste gas and the predetermined body of water including the nano-bubbles are subjected to decomposition and oxidation treatments, wherein the predetermined water is Nano Super Ion Water;
    directing the waste gas mixed with the predetermined body of water including the nano-bubbles to a swirling unit, so that the waste gas mixed with the predetermined body of water is swirled within the swirling unit, wherein the swirling unit is a cylinder having a swirl stage; and
    exhausting the treated waste gas;
    wherein, the pH value of the Nano Super Ion Water is between 8 and 14, and a half-width value of the Nano Super Ion Water measured by $^{17}$O-NMR is between 45 Hz and 70 Hz.

2. The waste gas treatment method with the application of the nano-bubbles of claim 1, comprising steps of:
    feeding the waste gas from a bottom of the accommodating space; and
    generating the predetermined body of water including the nano-bubbles at the top of the accommodating space.

3. The waste gas treatment method with the application of the nano-bubbles of claim 2, comprising steps of:
    nebulizing the predetermined body of water at the bottom of the accommodating space, in order to react with the waste gas; and
    discharging the predetermined body of water reacted with the waste gas to a circulating water system.

4. The waste gas treatment method with the application of the nano-bubbles of claim 2, comprising steps of:
    generating anions at the bottom of the accommodating space.

5. A waste gas treatment system with the application of nano-bubbles, comprising:
    an air inlet configured to provide waste gas to an accommodating space;
    a nano-bubble generating device disposed in the accommodating space, wherein the nano-bubbles generating device is configured to provide a predetermined body of water and generating the nano-bubbles within the predetermined water; the predetermined body of water including the nano-bubbles and the waste gas is subjected to decomposition and oxidation treatments; and
    an airflow swirling device comprising a drive unit and a swirling unit, wherein the swirling unit is connected to the accommodating space; the drive unit is between the swirling unit and the accommodating space so as to receive the waste gas mixed with the predetermined body of water including the nano-bubbles, wherein the swirling unit is a cylinder having a swirl stage;
    wherein the predetermined body of water is Nano Super Ion Water, the pH value of the Nano Super Ion Water is between 8 and 14, and a half-width value of the Nano Super Ion Water measured by $^{17}$O-NMR is between 45 Hz and 70 Hz;
    wherein the predetermined body of water including the nano-bubbles and the waste gas is subjected to the cavitation effect and supercritical water oxidation, so as to remove a harmful substances within the waste gas.

6. The waste gas treatment system with the application of the nano-bubbles of claim 5, wherein the nano-bubble generating device comprises a nano-bubble generator which is disposed nearby the top of the accommodating space, so as to generate the nano-bubbles within the predetermined body of water.

7. The waste gas treatment system with the application of the nano-bubbles of claim 6, wherein the nano-bubble generator is connected to a circulating water system, so as to obtain the predetermined body of water.

8. The waste gas treatment system with the application of the nano-bubbles of claim 6, wherein the nano-bubble generating device further comprises a nebulizer which is disposed nearby a bottom of the accommodating space, so that the predetermined body of water is sprayed as water mist.

9. The waste gas treatment system with the application of the nano-bubbles of claim 8, wherein the nebulizer is connected to a circulating water system.

10. The waste gas treatment system with the application of the nano-bubbles of claim 5, further comprising an anion generator which is disposed nearby the bottom of the accommodating space, so as to generate anions.

* * * * *